US006889939B2

United States Patent
Rouyre et al.

(10) Patent No.: US 6,889,939 B2
(45) Date of Patent: May 10, 2005

(54) DEVICE FOR FIXING A MEMBER TO AN AIRCRAFT STRUCTURE

(75) Inventors: François Rouyre, Cornebarrieu (FR); Loic Le Lay, L'Isle Jourdain (FR)

(73) Assignee: Airbus France (FR)

( * ) Notice: Subject to any disclaimer, the term of this patent is extended or adjusted under 35 U.S.C. 154(b) by 0 days.

(21) Appl. No.: 10/383,664

(22) Filed: Mar. 7, 2003

(65) Prior Publication Data

US 2003/0168554 A1 Sep. 11, 2003

(30) Foreign Application Priority Data

Mar. 8, 2002 (FR) .............................................. 0202951
May 28, 2002 (FR) .............................................. 0206472

(51) Int. Cl.$^7$ ................................................ B64C 1/06
(52) U.S. Cl. ....................... 244/131; 244/132; 403/384; 403/389; 411/955; 411/965; 411/395
(58) Field of Search ............................ 244/117 R, 119, 244/131, 132; 403/384, 389; 411/955, 965, 427, 395

(56) References Cited

U.S. PATENT DOCUMENTS

| 3,563,131 A | 2/1971 | Ridley .............................. 85/1 |
| 4,627,590 A | 12/1986 | Zeorlin ....................... 248/351 |
| 5,542,777 A | 8/1996 | Johnson ...................... 403/389 |

FOREIGN PATENT DOCUMENTS

WO 99/47822 9/1999

Primary Examiner—J. Woodrow Eldred
(74) Attorney, Agent, or Firm—VanOphem & VanOphem, P.C.

(57) ABSTRACT

An apparatus for fixing a member to an aircraft structure including: firstly, fixing device having a shank with a head at one end, an externally machined portion of its peripheral wall at its other end, and a longitudinal interior thread at the same end as its externally machined portion, secondly, a bushing which cooperates with the machined portion of the shank so as to be fixed to the shank; and thirdly, an attachment device for attaching the member and having a threaded shank cooperating with the longitudinal interior thread.

10 Claims, 3 Drawing Sheets

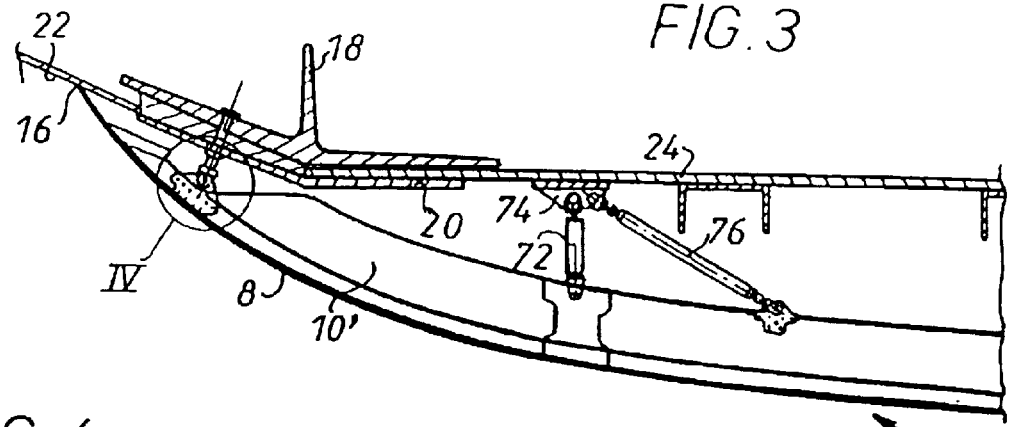
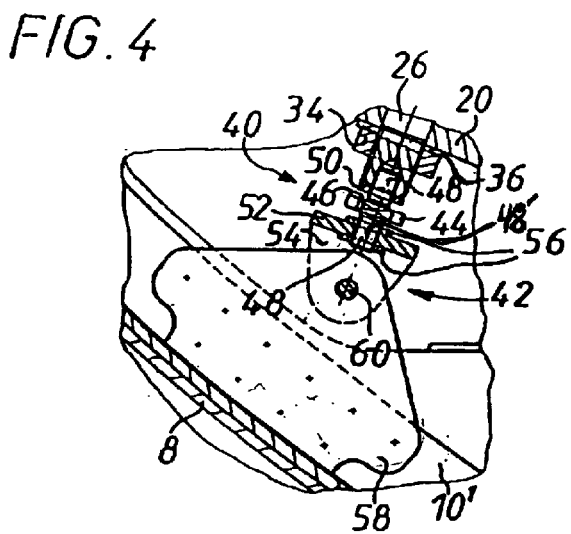
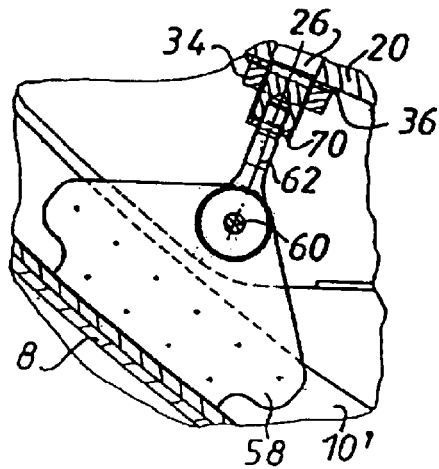
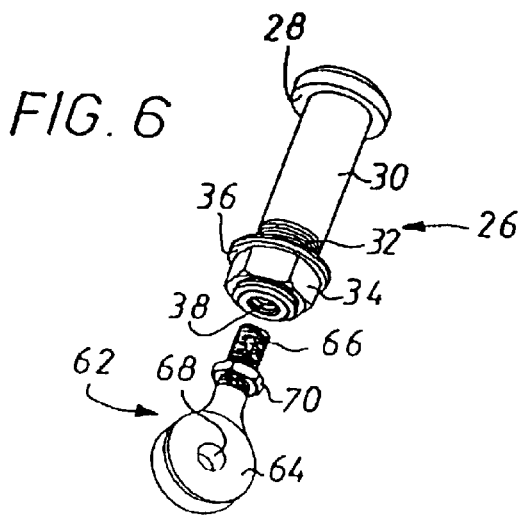

DEVICE FOR FIXING A MEMBER TO AN AIRCRAFT STRUCTURE

CROSS REFERENCE TO RELATED APPLICATIONS

This application claims the benefit of French Patent Application No. 0202951 filed Mar. 8, 2002, and French Patent Application No. 0206472 filed May 28, 2002.

BACKGROUND OF THE INVENTION

1. Field of the Invention

The present invention relates to an apparatus for fixing a member to an aircraft structure, for example a fairing, more particularly a belly fairing, or any type of conduit (for electricity, air, water, hydraulic fluid, etc.).

2. Description of the Related Art

There is a limited number of anchorage points for fixing a member to an aircraft structure because it is necessary to avoid the risk of weakening the structure. Special methods must therefore be used to drill or tapp holes in the structure. The resulting costs are relatively high and the number of fixing points is therefore intentionally limited. The same fixing point is therefore sometimes used to fix more than one member.

If a fixing point is used to fix more than one member, the position of the fixing point is not necessarily an ideal position for all the members. In the case of fixing an aircraft belly fairing, for example, if there is a relatively large overhang between a free edge of the fairing and its fixing point, it is possible to use the available fixing point and to fix the fairing by triangulation from that point. A first tie-rod substantially perpendicular to the fairing connects the fixing point to the fairing. The second tie-rod connects a point near the free edge of the fairing to the nearest fixing point. The second tie-rod limits the overhang but is significantly inclined in a direction normal to the fairing and is therefore unable to resist high tear-off forces.

It is therefore an object of the present invention to provide an apparatus that does not use the usual anchorage points on an aircraft structure. Of course, given the aeronautical application of an apparatus of this kind, the apparatus must ensure excellent fixing of members to the structure.

BRIEF SUMMARY OF THE INVENTION

The present invention proposes a system for fixing a member to an aircraft structure, the system includes: firstly, fixing devices having a shank with a head at one end, an externally machined portion of its peripheral wall at its other end, and a longitudinal interior thread at the same end as its externally machined portion, secondly, a bushing adapted to cooperate with the machined portion of the shank so as to be fixed to the shank; and thirdly, attachment devices for attaching the member and having a threaded shank cooperating with the longitudinal interior thread.

The member is fixed to a fixing device of the structure. A tapped hole is usually used for fitting the fixing device. Such devices are sometimes known as "pull-ins" and are used to assemble components of the aircraft structure. The invention proposes to fix a member using the tapped hole in a pull-in bolt after the latter is fitted. The fixing device is usually fitted so that the thread is at the end toward the interior of the aircraft, i.e. at the end opposite the member to be fixed. It suffices to fit the fixing device the other way around, so that the thread can be used to fix the member.

The machined rod can be a threaded rod, in which case the corresponding bushing is a nut. The rod can instead resemble a bolt, but with imprints in place of the thread. The bushing is then a crimping ring that is crimped to the end of the rod.

The attachment device includes a bore substantially perpendicular to the machined rod, for example, which allows the fixing member and the fairing to be connected with the aid of a pin, as is standard practice when fixing using a tie-rod.

The attachment device is fixed to the machined rod and to the thread and to guarantee that the attachment device is immobilized relative to them, it advantageously includes a lock-nut cooperating with the threaded rod of the fixing device.

In a preferred embodiment, the attachment device according to the invention takes the form of an eyebolt provided with a threaded rod. The attachment device then comprises only one part, which can be associated with a lock-nut.

In a different embodiment, the attachment device according to the invention includes a threaded shaft cooperating with the thread on the threaded rod and a yoke fixed to the shaft. This solution uses two parts (and where applicable lock-nuts). It guarantees correct mounting and orientation of the attachment device relative to the member to be fixed. The threaded shaft can be screwed all the way into the interior thread and the yoke can then be positioned relative to the axis. In this latter embodiment, the yoke is screwed to the threaded shaft, for example, and disposed between two nuts on the shaft.

In a different embodiment, suitable in particular for fixing conduits of all kinds (electrical, pneumatic, hydraulic, etc.), the attachment device includes a clip fixed to the machined rod by a bolt, for example.

The present invention also provides an aircraft whose structure includes fixing devices including: firstly, a shank having a head at one end, an externally machined portion of its peripheral wall at its other end, and a longitudinal interior thread at the same end as its externally machined portion; and secondly, a bushing adapted to cooperate with the machined portion of the shank so as to be fixed to the shank, in which aircraft the head of a fixing device is oriented toward the interior of the aircraft and the shank and its interior thread are oriented toward the exterior of the aircraft.

Details and advantages of the present invention will emerge more clearly from the following description, which is given with reference to the accompanying diagrammatic drawings.

BRIEF DESCRIPTION OF THE SEVERAL VIEWS OF THE DRAWINGS

FIG. 3 is an enlarged sectional view taken along the line III—III of FIG. 1, showing the fixing of the belly fairing close to a free edge under a wing of the aircraft;

FIG. 4 is an enlarged view of the detail IV in FIG. 3;

FIG. 5 is a view corresponding to FIG. 4 that shows an alternate embodiment;

FIG. 6 is an exploded perspective view of the fixing device and attachment device of FIG. 5;

DETAILED DESCRIPTION OF THE PREFERRED EMBODIMENTS

Figure 1:
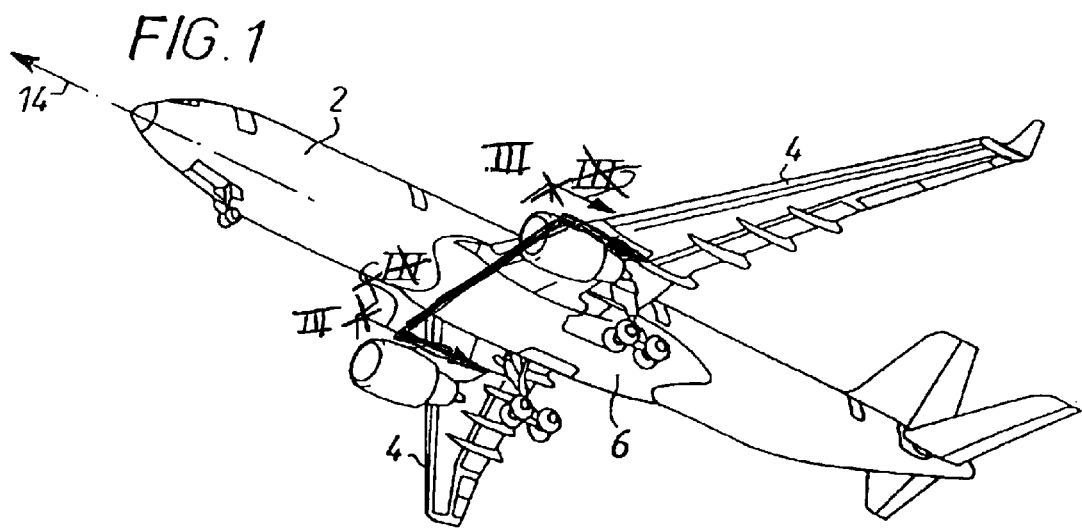
FIG. 1 is a perspective bottom view of an aircraft and its belly fairing.
Figure 2:
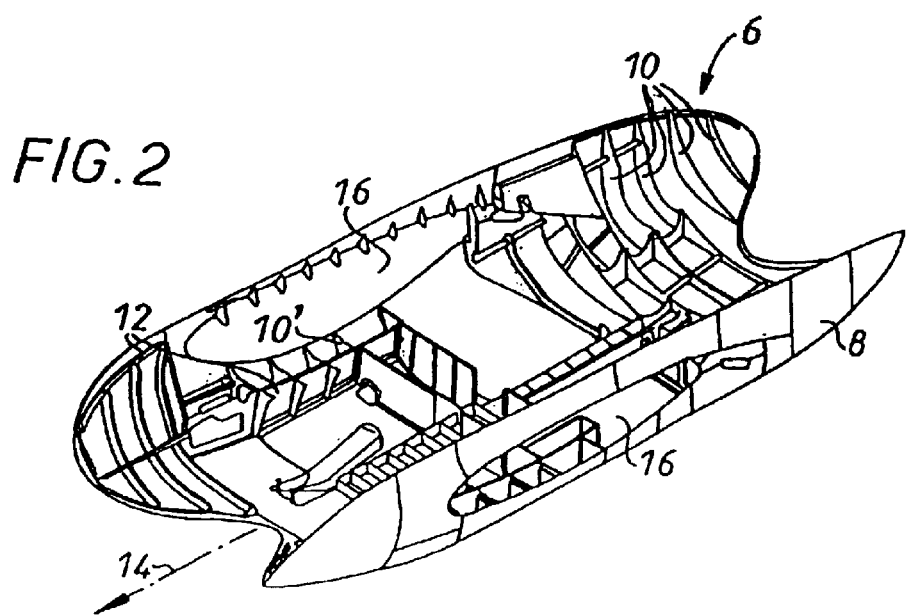
FIG. 2 is a perspective view of one example of a belly fairing.

FIG. 1 is a perspective bottom view of a passenger aircraft which has a fuselage 2 and two wings 4. The lower portion of the fuselage 2 carries a belly fairing 6 between the wings 4. FIG. 2 is a perspective view of one example of a belly fairing 6. This figure shows that the belly fairing 6 has an exterior surface 8 stiffened by ribs known as frames 10 or webs 12, according to their orientation relative to an axis 14 of the aircraft. The exterior surface 8 has openings 16 at the inboard ends of the wings 4.

A first application of the present invention relates to fixing the belly fairing 6 to the structure of the fuselage 2 (see FIGS. 3 to 6). It relates in particular to fixing the belly fairing 6 such that the openings 16 are configured to permit the wings 4 to pass therethrough.

FIG. 3 is a view in cross section taken along line III—III of FIG. 1. This figure shows a frame 10' (FIGS. 2 and 3). In addition to the frame 10' and the exterior surface 8 of the belly fairing 6, FIG. 3 also shows a section 18, a corresponding cover section 20, a portion 22 of the inboard end of a wing 4, and a lower wing surface panel 24.

As seen in FIGS. 3–4, the lower wing surface panel 24 is sandwiched between the section 18 and its cover section 20. Likewise the portion 22 of the inboard end of the wing 4 is similarly sandwiched between [§] section 18 and cover [§] section 20. This assembly uses fixing devices or special bolts 26 usually called "pull-in bolts". Unlike conventional bolts, pull-in bolts are designed to work in shear. FIG. 6 shows a pull-in bolt 26. It conventionally has a head 28, a shank 30 and an exterior thread 32 at the end opposite the head 28. The thread is designed to receive a nut 34, and usually a washer 36. In order to resist high shear loads, the pull-in bolt is made from an alloy known for its high strength and is machined by a process that does not produce swarf.

As shown in FIG. 6, the pull-in bolt 26 also has an interior thread 38. The interior thread 38 is concentric with the axis of the pull-in bolt 26 and is formed in its shank 30. The interior thread 38 has a diameter significantly less than that of the exterior thread 32. It opens onto the end face of the pull-in bolt opposite the head 28 and is usually from 10 mm to 20 mm long.

The pull-in bolt 26 is usually fitted so that its head 28 bears on the cover section 20 and the washer 36 and the nut 34 are on the same side as the section 18. It is fitted by screwing a threaded rod (not shown) into the interior thread 38. The threaded rod is then pulled toward the interior of the aircraft by a hydraulic tool, entraining the pull-in bolt 26 with it. The shank 30 of the pull-in bolt 26 is then accommodated in bores (not shown) provided for this purpose in the section 18, the cover section 20 and the structural member to be fixed. The diameters of the bores and the shank 30 are such that the pull-in bolt 26 must be forced into place. Once the pull-in bolt 26 is in place, the threaded rod of the hydraulic tool is unscrewed from the interior thread 38 and the washer 36 and the nut 34 is fitted. The nut 34 is then tightened to a predetermined torque.

The present invention proposes to fit the pull-in bolt 26 "the other way around", i.e. with the head 28 on the same side as the section 18 and the nut 34 on the same side as the cover section 20. In this way, the interior thread 38 is on the same side as the belly fairing 6 and the interior thread 38 provides a fixing point for the fairing 6.

The pull-in bolt 26 is fitted by the procedure described above, it is just that the pull-in bolt 26 is positioned differently.

FIG. 4 shows one example of fixing the belly fairing 6 using the interior thread 38 and an attachment device which includes a shaft 40 and a yoke 42.

The shaft 40 has a central portion 44 with flats 46 and two coaxial threaded portions 48, 48' on opposite sides of the central portion 44. One threaded portion 48 is screwed all the way into the interior thread 38. A lock-nut 50 is fitted and tightened to ensure that the threaded portion 48 remains screwed all the way into the interior thread 38.

The yoke 42 takes the form of a stirrup member with a base 52 and two branches 54 substantially perpendicular to the base 52, which is internally threaded so that it can be screwed onto the second threaded portion 48 of the shaft 40, with the base 52 substantially parallel to the cover section 20. Nuts 56 hold the yoke 42 in position relative to the shaft 40.

The frame 10' is equipped with a fixing member 58. A pin 60 passing through bores (not shown) in the fixing member 58 and in the branches 54 connects the fixing member 58 to the branches 54 of the yoke 42.

FIG. 5 shows a different way of fixing the belly fairing 6 using the pull-in bolt 26 and its interior thread 38. Here the shaft 40 and the yoke 42 are replaced by an eyebolt 62. The latter is shown to a larger scale in FIG. 6. The eyebolt 62 has a head 64 connected to a threaded portion 66. The head 64 is the same shape as the end of a tie-rod, and is therefore substantially cylindrical, and has a thickness that is small compared to its diameter. A hole 68 at its center is adapted to receive the pin 60 (see FIG. 5). The threaded portion 66 is perpendicular to the axis of the head 64 and the hole 68. The thread on the threaded portion 66 matches the interior thread 38 of the pull-in bolt 26.

The eyebolt is preferably fitted by screwing the threaded portion 66 all the way into the interior thread 38. Ideally, in this position, the head 64 of the eyebolt is oriented correctly for the pin 60 to be inserted into the hole 68 and the corresponding hole (not shown) in the fixing member 58. However, if its orientation is not correct, the eyebolt is unscrewed until it is in the correct position. To enable it to be retained in this position, a lock-nut 70 can be screwed onto the threaded portion 66 before it is screwed into the interior thread 38. Once the eyebolt 62 is correctly positioned relative to the pull-in bolt 26, the lock-nut 70 is tightened against the pull-in bolt 26 thereby immobilizing the eyebolt 62.

FIG. 3 shows a first tie-rod 72 connecting the lower wing surface panel 24 to the frame 10'. On the lower wing surface panel 24 is a fixing member 74 of the same type as the fixing member 58 shown in FIGS. 4 and 5. The first tie-rod 72 has an eyelet at each end and a pin can therefore be used to fix the first tie-rod 72 to the fixing member 74. The opposite end of the first tie-rod 72 is fixed in the same way to the fixing member 58 of the frame 10'.

FIG. 3 shows a second tie-rod 76 which connects the fixing member 74 to the frame 10'. Here the fixing point on the frame 10' is offset toward the center of the aircraft. The belly fairing 6 is retained by triangulation with the aid of the tie-rods 72 and 76.

It would equally be possible, starting with the same fixing member 74, to perform a triangulation to retain the belly fairing 6 in the vicinity of the opening 16. The alternative solution proposed by the invention firstly guarantees improved fixing of the belly fairing 6 to the aircraft structure. This is because an apparatus according to the invention, as described above with reference to FIG. 4 or FIG. 5, is more resistant to forces tending to tear off the belly fairing 6 since the apparatus is substantially perpendicular to the fairing and therefore works essentially in traction. A tie-rod such as the second tie-rod 76 is strongly inclined in a direction normal to the exterior surface 8 of the belly fairing 6 and is therefore less effective at resisting forces tending to tear off the belly fairing 6.

Using the interior thread 38 of the pull-in bolt 26 as a fixing point further reduces the overhang of the belly fairing 6 through an appropriate choice of the pull-in bolt 26. FIG. 3 shows that a tie-rod such as the second tie-rod 76 could not be located as close to the passage 16 for the wing 4 as the apparatus according to the invention shown in FIG. 3.

Finally, an apparatus according to the present invention has the advantage of a lower unit price than prior art solutions while providing excellent fixing, as described above. No particular adaptation is required to the structure of the aircraft and fitting an apparatus according to the invention (for example a shaft and a yoke or an eyebolt) requires no more time, and possibly less time, than fitting a tie-rod.

Figure 7:
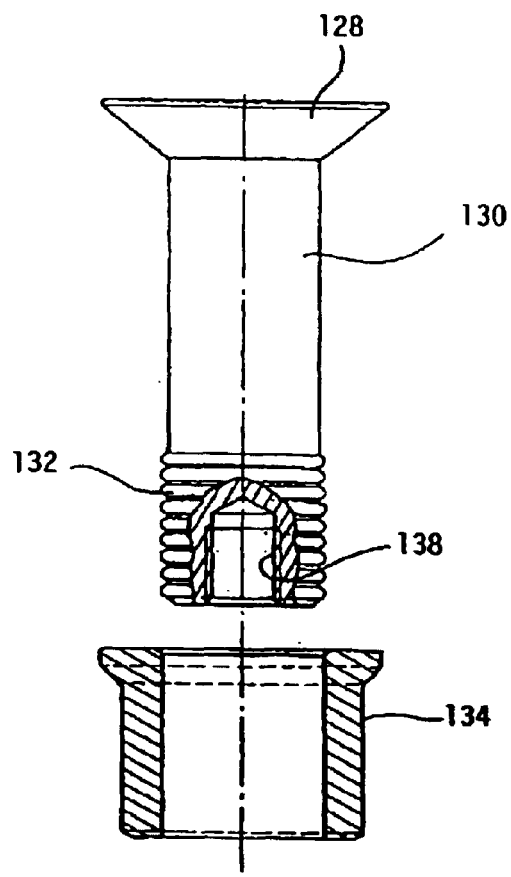
FIG. 7 shows partly in section a fixing device adapted to receive an attachment device according to the invention.

An alternate apparatus according to the invention can also be used with a fixing device other than the pull-in bolt 26 and its nut 34. FIG. 7 shows a different fixing member that can also receive the attachment devices according to the invention described above.

The FIG. 7 fixing device has a shank 130 and a bushing 134. The shank 130 is generally cylindrical. The shank 130 has at one end a flat countersunk head 128. The other end of the shank 130 carries peripheral imprints 132 forming a series of parallel circular grooves. Just like the shank 30 of the pull-in bolt 26, the shank 130 has an interior thread 138 which is concentric with the axis of the shank 130 and whose diameter is significantly less than the outside diameter of the shank 130. The interior thread 138 opens onto the end face of the shank 130 opposite the head 128 and is usually from 10 mm to 20 mm long.

The bushing 134 can be crimped onto the imprints 132 on the shank 130. It has a substantially smooth interior surface which is deformed by crimping to espouse the shapes of the peripheral imprints 132.

The shank 130 can be fitted into bores without using any special tool (unlike the pull-in bolt 26 described above). Once in place, the threaded end of a tool is screwed into the interior thread 138 and traction is applied to the shank 130 to apply a high pressure at the head 128. The bushing 134 is pushed in the opposite direction and then crimped. This produces an excellent permanent assembly. Once the assembly has been completed, the tool is removed from the interior thread 138, which remains free.

Figure 8:
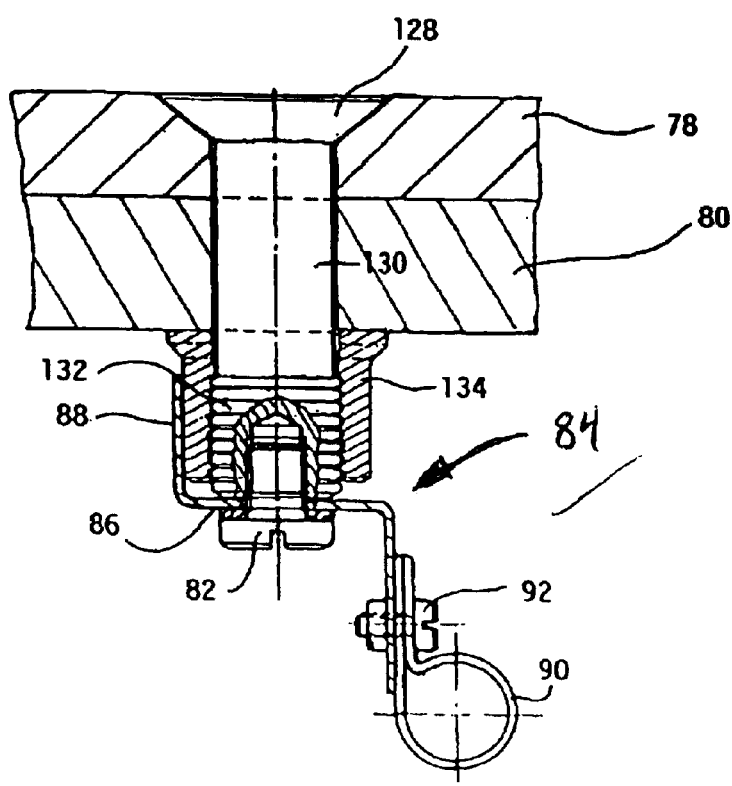
FIG. 8 shows an alternate embodiment of a fixing lug according to the invention fitted to the fixing device of FIG. 7.

FIG. 8 shows an embodiment of an alternate apparatus according to the invention combined with the fixing device from FIG. 7. This embodiment can also be used in conjunction with a pull-in bolt 26. In FIG. 8, the fixing device connects a panel 78 to a structural member 80. These two members are clamped between the bushing 134 and the head 128. After assembling these two members, the interior thread 138 remains free. The interior thread 138 then receives a bolt 82 used to retain a fixing lug 84 which has a bearing face 86 bearing against the face of the shank 130 onto which the interior thread 138 opens. A rim 88 is provided on one side of this surface to bear against the exterior wall of the bushing 134 and thereby locate the fixing lug 84 correctly. Opposite the rim 88, the fixing lug 84 is bent and carries a clip 90 attached by a nut and bolt 92. The clip 90 can then receive any type of conduit (electrical, pneumatic, hydraulic, etc.). The size and type of clip are adapted to suit the type of conduit to be fixed.

The present invention is not limited to the embodiments described above by way of nonlimiting example. It also relates to all embodiments that may suggest themselves to the person skilled in the art that fall within the scope of the following claims.

What is claimed is:

1. A fastener apparatus for attaching a member to a structure of an aircraft, said fastener apparatus comprising:

a shank having a first end and a second end opposite side first end, said first end having a head portion, said second end having an external threaded portion and a plain non-thread shank portion between said head portion and said threaded portion, said second end further having an internally threaded hole therein;

a lock nut member mounted to said external threaded portion of said second end of said shank to lock said shank to said structure of said aircraft; and means for attaching said member to said shank, said attachment means having an externally threaded portion at one end thereof and a means for mounting at an opposite end thereof, said externally threaded portion of said attaching means being complimentary to said internally threaded hole of said shank.

2. The fastener apparatus as claimed in claim 1, wherein said means for attaching includes a bore substantially perpendicular to said shank.

3. The fastener apparatus as claimed in claim 1, further comprising a lock-nut attached to said means for attaching.

4. The fastener apparatus as claimed in claim 1, wherein said means for attaching comprises an eyebolt with a threaded portion.

5. The fastener apparatus as claimed in claim 1, wherein said means for attaching comprises:

a threaded shaft engaged by said interior thread of said shank; and a yoke fixed to said shaft.

6. The fastener apparatus as claimed in claim 5, wherein said means for attaching comprises two nuts disposed on said threaded shaft, and said yoke is screwed to said threaded shaft and is disposed between said two nuts.

7. The fastener apparatus as claimed in claim 1, wherein said means for attaching includes a clip bolted to said shank.

8. A fastener apparatus for attaching a member to a structure of an aircraft, said fastener apparatus comprising:

a shank having a first end and a second end opposite said first end, said first end having a head portion, said second end having an externally end treatment portion and a plain untreated shank portion between said head portion and said end treatment portion, said second end further having an internally threaded hole therein;

a locking member mounted to said external end treatment portion of said shank to lock said shank to said structure of said aircraft;

means for permanently fixing said locking member to said end treatment portion of said shank; and means for attaching said member to said shank, said attachment means having an externally threaded portion at one end thereof and a means for mounting at an opposite end thereof, said externally threaded portion of said attaching means being complimentary to said internally threaded hole of said shank.

9. The fastener apparatus as claimed in claim 8 wherein said locking member comprises:
   a bushing member mounted to said external end treatment portion of said shank; and
   wherein said means for permanently fixing said locking member comprises means for crimping said bushing member to said external end treatment portion of said shank.

10. The fastener apparatus as claimed in claim 9 wherein said means for attaching said member to said shank further comprises:
   a screw member having an externally threaded portion; and
   a fixing lug bracket member mounted to said screw member such that as said externally threaded portion of said screw member is threaded into said internally threaded hole of said shank, said member fixing lung bracket member is mounted to said shank.

* * * * *

UNITED STATES PATENT AND TRADEMARK OFFICE
CERTIFICATE OF CORRECTION

PATENT NO.    : 6,889,939 B2
DATED         : May 10, 2005
INVENTOR(S)   : Rouyre et al.

It is certified that error appears in the above-identified patent and that said Letters Patent is hereby corrected as shown below:

Column 6,
Line 18, kindly delete "non-thread" and insert -- non-threaded --.

Signed and Sealed this

First Day of November, 2005

JON W. DUDAS
*Director of the United States Patent and Trademark Office*